United States Patent Office 2,799,117
Patented July 16, 1957

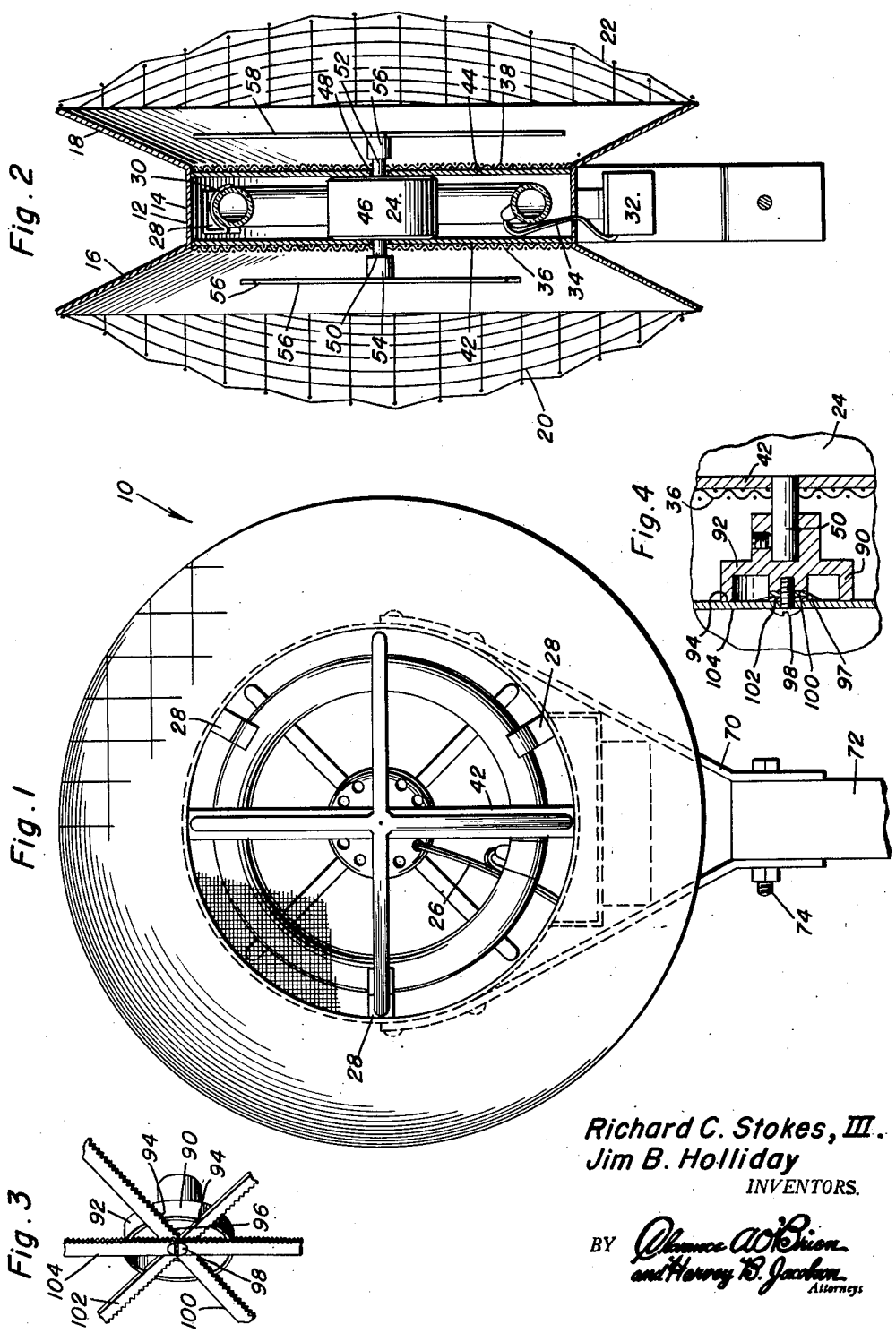

2,799,117
BUG CATCHER

Richard C. Stokes III, Greenville, and Jim B. Holliday, Washington, N. C., assignors to Southeastern Engineering, Incorporated, Greenville, N. C., a corporation of North Carolina Application May 8, 1956, Serial No. 583,562

7 Claims. (Cl. 43—113)

This invention relates to a bug catcher and more particularly means for attracting and killing various types of insects.

As is well known, insect pests often traveling in swarms or hordes are not only troublesome but often cause an excessive amount of damage in agricultural communities. It is therefore necessary and desirable that these insect pests be exterminated in a convenient and rapid manner. The primary object of the present invention resides in the provision of means which will not only attract insects to certain extermination but will chop and grind the insects so that they may be readily used for fertilizer or for feeding stocked lakes and ponds should the invention be mounted thereover.

Another object of the present invention resides in the provision of a bug catcher which has readily removable and replaceable blades for use in exterminating insects, which blades are of a relatively flat shape.

Another object of the present invention resides in the provision of a bug catcher which has a pair of opposed shafts on which relatively flat blades are mounted which blades do not prevent proper operation by the other set thereof even though they are arranged in opposed relation thereby allowing bugs to enter the bug catcher from opposite directions.

Still further objects and features of this invention reside in the provision of a bug catcher that is simple in construction, efficient in use and inexpensive to manufacture thereby permitting wide use and distribution.

These, together with the various ancillary objects and features of the invention which will become apparent as the following description proceeds, are attained by this bug catcher, a preferred embodiment of which has been illustrated in the accompanying drawings, by way of example only, wherein:

Figure 1 is an elevational view of the bug catcher comprising the present invention;

Figure 2 is a longitudinal sectional view of the bug catcher;

Figure 3 is a partial perspective view illustrating a modified form of attachment for blades to the fitting on the end of the opposed shafts of the bug catcher; and Figure 4 is a sectional detail view as taken along the plane of line 4—4 in Figure 3.

With continuing reference to the accompanying drawings wherein like reference numerals designate similar parts throughout the various views, reference numeral 10 is used to generally designate the bug catcher comprising the present invention. This bug catcher includes a housing 12 which has a generally cylindrical central portion 14 with mouth portions 16 and 18 preferably integrally formed therewith or attached thereto. The mouth sections 16 and 18 are of a truncated conical shape and widen outwardly from the central section 14 as can be best seen in Figure 2. Secured in overlying relationship with respect to the mouth sections are a pair of wide mesh screens 20 and 22 which may be detachably secured if so desired by any suitable fasteners such as screws or bolts. These wide mesh screens 20 and 22 serve as guards to prevent the accidental entrance of limbs or the like into the whirling blades of the bug catcher but do not inhibit the entrance of insects into the bug catcher.

Mounted in the central section 14 is a motor 24 powered by a suitable source of electrical power through conductors as at 26 connected thereto. Positioned concentrically about the motor 24 and held in place by suitable mounting brackets as at 28 is a ring-shaped lamp 30 which may be of a fluorescent type. Of course, a suitable ballast and/or resistance outlet 32 for the lamp 30 may be suspended from the housing 12 and connected thereto by suitable conductors 34 which means, not shown, may be used to not only actuate the motor 24 but to connect electrical power to the lamp 30.

A pair of screens of relatively fine mesh as indicated at 36 and 38 are provided and close the central section 14 of the housing 12 so as to prevent entrance of the insects into the motor 24 and onto the lamp 30. These screens 36 and 38 may be supported by suitable braces as at 42 and 44 as may be desired. Extending through suitable apertures in the braces 42 and 44 as indicated at 46 and 48 are shafts 50 and 52 carrying fittings 54 and 56 to which sets of flat blades as indicated at 56 and 58 are attached. These flat blades are utilized so as not to provide a directional flow of air whereby a minimum amount of air will be directed through the screens 36 and 38 yet the rapidly rotating blades 56 and 58 which have little wind resistance will suffice to cut and exterminate insects. Further, sufficient vortices will be induced by the blades 56 and 58 to generally prevent exit of the insects once they are passed through the meshes 20 and 22. The blades 56 and 58 since they are arranged in opposed relationship do not draw the insects in through the screens 20 and 22 since the lamp 30 is a sufficient attraction.

A suitable supporting yoke or mounting bracket 70 may be provided for attaching the invention on a post 72 which may be mounted in any suitable field or mounted in a pond or lake so that the remains of the insects may serve as fish food or may be utilized to fertilize the ground. The mounting bracket 70 may be riveted, bolted, or otherwise attached preferably to the central section 14 of the housing 12 for appearance and rigidity sake. Suitable bolts as at 74 may be utilized to affix the bracket 70 to the post 72.

In the embodiment of the invention as is shown in Figure 3, the fitting 90 which may be utilized in lieu of the fitting 54 may include a ring 92 having notches as at 94 arranged at spaced intervals around the peripheral edge thereof. The fitting may further include a raised central portion 96 which does not extend outwardly as far as the ring 92 but which is internally threaded as at 97 for reception of a threaded screw fastener 98. This screw fastener is adapted to extend through apertures in the flat blades as at 100, 102, 104 which are arranged so as to seat within the notches 94. It is noted that the blades 100, 102 and 104 may be constructed by merely drilling holes through the centers of conventional hacksaw blades whereby if the blades are broken because of fatigue or other reasons, another blade may be readily substituted. Of course, the teeth on a conventional hack saw blade provide ideal means for exterminating insects when they are rapidly moving.

Since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A bug catcher comprising a housing, a fluorescent tube in said housing, screens disposed on each side of said tube in said housing, a motor disposed in said housing between said screens, shafts attached to and driven by said motor extending through said screens, and blades secured to said shafts.

2. A bug catcher comprising a housing having a tubular central section, said housing having truncated conical widening mouth sections on each side of said tubular section, a motor in said central section, a fluorescent tube in said central section, screens disposed on each side of said tube in said housing, shafts attached to and driven by said motor extending through said screens, and blades secured to said shafts.

3. A bug catcher comprising a housing having a tubular central section, said housing having truncated conical widening mouth sections on each side of said tubular section, a motor in said central section, a ring-shaped lamp in said central section concentrically disposed about said motor, fine mesh screens disposed on each side of said central section closing said central section and encasing said motor and said lamp, shafts attached to and driven by said motor extending through said screens, and blades secured to said shafts.

4. A bug catcher comprising a housing having a tubular central section, said housing having truncated conical widening mouth sections on each side of said tubular section, a motor in said central section, a ring-shaped lamp in said central section concentrically disposed about said motor, fine mesh screens disposed on each side of said central section closing said central section and encasing said motor and said lamp, shafts attached to and driven by said motor extending through said screens, blades secured on said shafts, and wide mesh screens secured to said mouth sections guarding said blades.

5. A bug catcher comprising a housing, a fluorescent tube in said housing, screens disposed on each side of said tube in said housing, a motor disposed in said housing between said screens, shafts attached to and driven by said motor extending through said screens, fittings on the ends of said shafts, and blades detachably secured to said fittings.

6. A bug catcher comprising a housing having a tubular central section, said housing having truncated conical widening mouth sections on each side of said tubular section, a motor in said central section, a ring-shaped lamp in said central section concentrically disposed about said motor, fine mesh screens disposed on each side of said central section closing said central section and encasing said motor and said lamp, shafts attached to and driven by said motor extending through said screens, fittings on the ends of said shafts, each of said fittings including rings having spaced notches therein, said fittings having threaded recesses, a plurality of flat apertured blades, and threaded fasteners threadedly secured in said threaded recesses detachably securing said blades to said fittings with said blades seating in said notches.

7. A bug catcher comprising a housing having a tubular central section, said housing having truncated conical widening mouth sections on each side of said tubular section, a motor in said central section, a ring-shaped lamp in said central section concentrically disposed about said motor, fine mesh screens disposed on each side of said central section closing said central section and encasing said motor and said lamp, shafts attached to and driven by said motor extending through said screens, fittings on the ends of said shafts, each of said fittings including rings having spaced notches therein, said fittings having threaded recesses, a plurality of flat apertured blades, and threaded fasteners threadedly secured in said threaded recesses detachably securing said blades to said fittings with said blades seating in said notches, and wide mesh screens secured to said mouth sections guarding said blades.

References Cited in the file of this patent
UNITED STATES PATENTS

| | | |
|---|---|---|
| 1,583,975 | Hunt | May 11, 1926 |
| 2,737,753 | Bittner | Mar. 13, 1956 |